Figure 1:
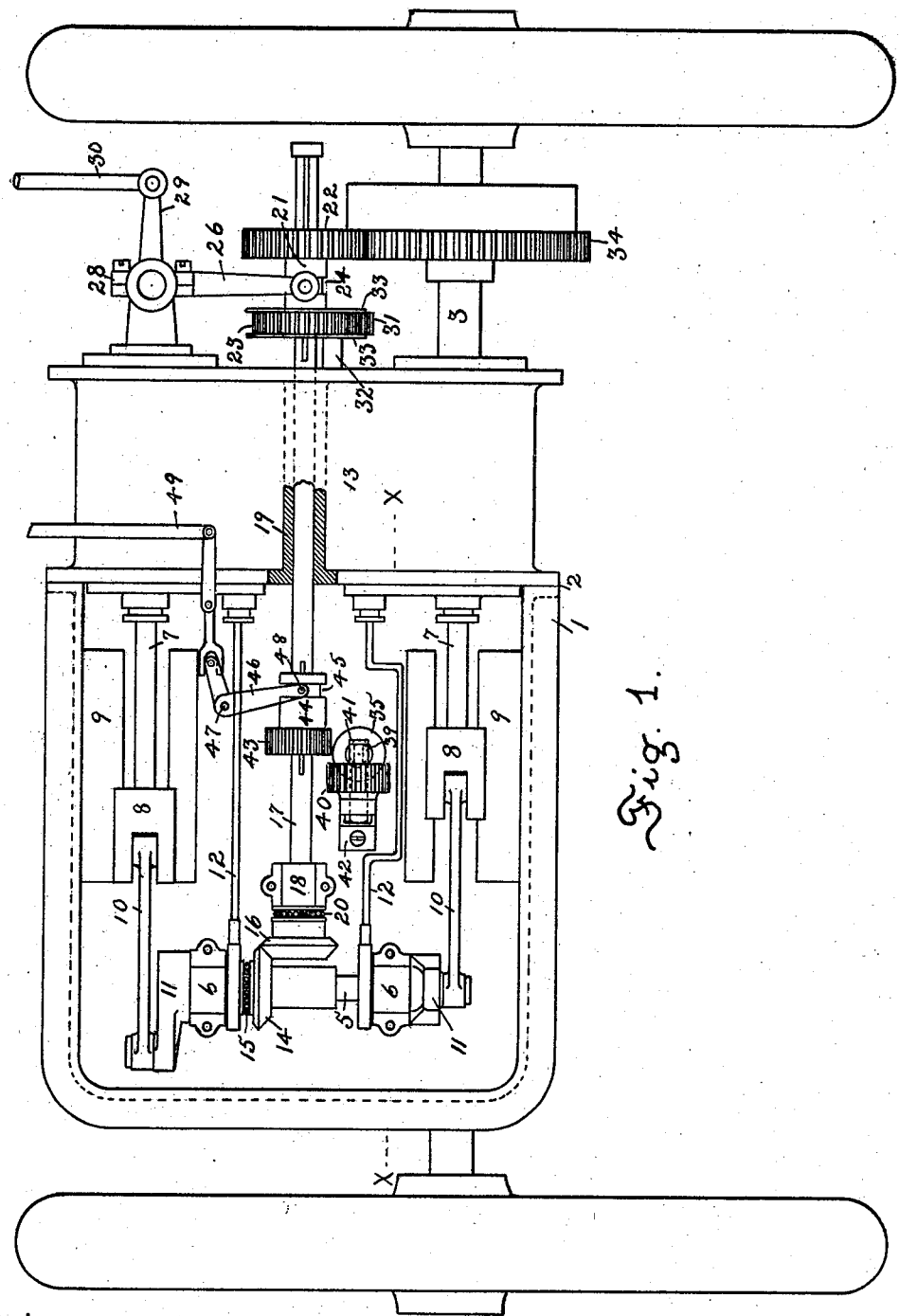

No. 712,329. Patented Oct. 28, 1902.
C. R. PFLAGING.
ENGINE FOR MOTOR VEHICLES.
(Application filed Aug. 4, 1902.)

(No Model.) 2 Sheets—Sheet 1.

Witnesses:
Herman R Heuman
Henry Watson

Inventor
Charles R. Pflaging
By Chapin & Ferguson
Attorney.

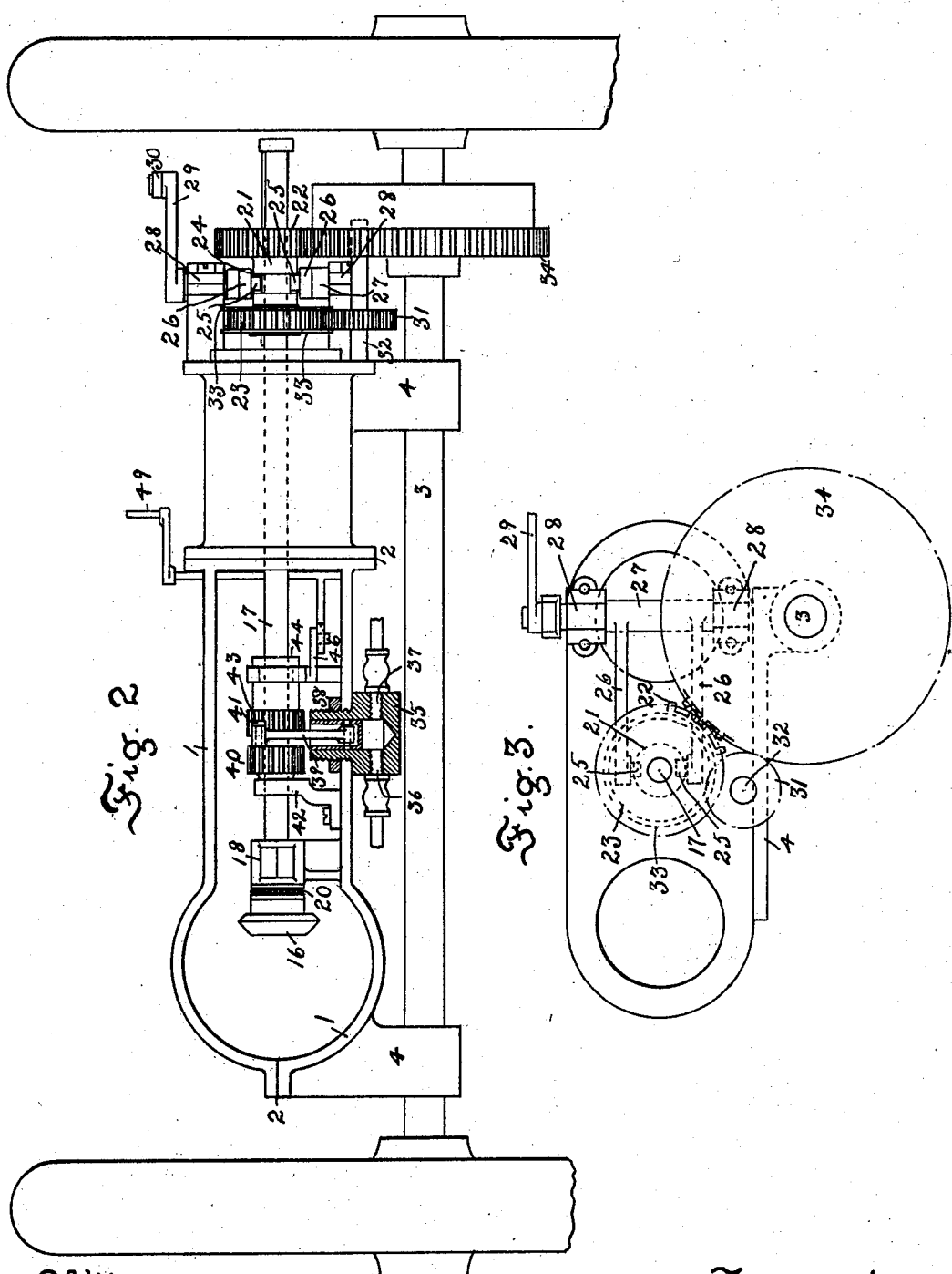

UNITED STATES PATENT OFFICE.

CHARLES R. PFLAGING, OF BALTIMORE, MARYLAND, ASSIGNOR OF ONE-HALF TO ORLANDO L. GOODEN, OF BALTIMORE, MARYLAND.

ENGINE FOR MOTOR-VEHICLES.

SPECIFICATION forming part of Letters Patent No. 712,329, dated October 28, 1902.

Application filed August 4, 1902. Serial No. 118,226. (No model.)

*To all whom it may concern:*

Be it known that I, CHARLES R. PFLAGING, a citizen of the United States, residing at Baltimore, in the State of Maryland, have invented certain new and useful Improvements in Engines for Motor-Vehicles, of which the following is a specification.

This invention relates to improvements in steam-engines, and is particularly designed for driving motor-vehicles.

Among the objects of my invention are to provide an engine having the cylinders and the crank-shaft with their intermediate parts connected in one rigid structure, whereby the relation between the cylinders and the crank-shaft will not be disturbed by strain or distortions of the vehicle-frame; to dispense with the use of chains as a means of transmitting power from the engine to the vehicle to be driven; to inclose the engine in a dust-proof casing to prevent dust and grit from coming in contact with the operative parts and to permit of the said parts being continuously run in oil without the use of packing to prevent the oil from working from the said casing; to provide means for throwing the engine out of gear when the vehicle is coasting, whereby the wear on the operative parts will be greatly reduced, and to provide means for throwing the pump in and out of operation when desired.

The invention consists of the new and novel parts and combination of parts hereinafter more fully set forth in the specification and pointed out in the claims.

In the accompanying drawings, Figure 1 is a plan view of my improved engine mounted upon the rear axle of a vehicle and having the upper portion of the casing removed. Fig. 2 is a vertical sectional view taken on the line X X of Fig. 1, and Fig. 3 is an end view.

Like reference-numerals indicate like parts throughout the several views of the drawings.

Referring to the accompanying drawings, forming part of this specification, 1 designates the casing in which the operative parts of the engine are inclosed, the said casing being made in two sections bolted together at 2. The engine is mounted upon the rear axle 3 of the vehicle and is held thereto by the brackets 4. The engine is provided with double cylinders having independent connections with the crank-shaft 5 and independent valves for controlling the supply and exhaust of pressure to said cylinders.

The crank-shaft 5 is mounted in bearings 6, which latter are bolted to the bottom of the casing 1. The piston-rods 7 extend from the cylinders and are connected to the sliding blocks 8, which latter are mounted on the guides 9, and the connecting-rods 10 extend from the said blocks 8 to the cranks 11 on the crank-shaft. The eccentrics 12 are mounted on the crank-shaft 5 between the piston-rods 7 and extend back into the steam-chest 13 and connect with the valves which control the supply and exhaust of pressure to the cylinders. A beveled gear 14 is keyed to the crank-shaft 5, and ball-bearings 15 are provided between the gear 14 and the eccentric to take up the side thrust of the said gear 14. This beveled gear 14 meshes with another beveled gear 16 on the shaft 17. The said shaft 17 projects at right angles to the crank-shaft and is mounted in the bearing 18, which latter is bolted to the bottom of the casing 1, and also in the bearing 19, which is cast integral with the steam-chest 13. Ball-bearings 20 are provided between the gear 16 and the bearing 18. One end of the shaft 17 projects through the bearing 19 beyond the steam-chest 13 and is provided with a sleeve 21, having the integral gear-wheels 22 and 23 on opposite ends thereof. In the center of the sleeve 21 is an annular groove 24, into which the lugs 25 of the projecting arms 26 extend. The arms 26 are cast integral with the shaft 27, which latter is mounted in the bearings 28. The upper end of the shaft 27 is provided with a square head over which one end of the lever 29 fits. To the outer end of the lever 29 is connected a rod 30, leading to the front of the vehicle. The gear-wheel 23 is always in mesh with the pinion 31, which latter is loosely mounted on the shaft 32 and is movable longitudinally with the said gear-wheel 23 through the medium of the flanges 33. A large gear-wheel 34 is keyed to the compensating gear on the axle 3 of the vehicle.

The operation of the engine and the manner of throwing the same in or out of gear with the vehicle is as follows: Power is transmitted from the cylinders, through the medium of the piston-rods 7, crank-shaft 5, and gear-wheels 14 and 16, to the shaft 17, which causes the sleeve 21, and consequently the gear-wheels 22 and 23, to revolve. When it is desired to drive the vehicle forward, the sleeve 21 is moved along the shaft 17 until the gear-wheel 23 comes in mesh with the large gear-wheel 34, keyed to the compensating gear on the axle 3, which will cause the said axle to revolve and the vehicle to move forward. When it is desired to reverse or cause the vehicle to travel backward, the sleeve 21 is moved along the shaft 17 through the medium of the rod 30, the lever 29, shaft 27, and arms 26, which will cause the pinion 31 to move with the gear-wheel 23, owing to the flanges 33 on the latter. When the said pinion 31 is brought into mesh with the gear-wheel 34 on the axle, power will be transmitted to the latter through the gear-wheel 23, pinion 31, and gear-wheel 34 and the vehicle moved backward, owing to the intermediate gear 31. When it is desired to coast, or allow the vehicle to run free, the sleeve 21 is moved on the shaft by the aforesaid mechanism until the gear-wheel 34 projects between the gear-wheels 22 and 23, which throws the engine out of gear with the vehicle and allows the engine to remain inactive, which greatly lessens the wear on the operative parts.

It will thus be seen that by providing the intermediate gear 31 the reverse motion can be imparted to the vehicle without reversing the engine.

The pump 35 is provided with the usual inlet and outlet passages 36 and 37, respectively, and projects through the bottom of the casing 1 and is held in position by the nut 38. The piston-rod 39 projects upwardly and is secured to the gear-wheel 40 by the crank-pin 41. The gear-wheel 40 is revolubly mounted on the bracket 42, which latter is bolted to the bottom of the casing 1. The gear-wheel 43 is keyed to the shaft 17 and is adapted to be moved longitudinally on said shaft for a limited distance. The said gear-wheel 43 is provided with an integral hub 44, having an annular groove 45. The bell-crank lever 46 is pivoted at 47 and has a pin 48 projecting from one of its arms into the groove 45 and the other arm connected to the rod 49. The gear-wheel 43 always revolves with the shaft 17 and is thrown in and out of gear with the wheel 40 by means of the bell-crank lever 46 and rod 49. Thus it will be seen that the pump 35 can be thrown out of gear when it is not in use, which greatly reduces the wear on the operative parts thereof.

It will be seen that by my present construction of engine the operative parts are inclosed in a dust-proof casing, which prevents the dust and grit from coming into contact with the said parts and also permits of the said parts being continuously run in oil. It will also be seen that the chains generally used in driving motor-vehicles are dispensed with.

Having thus described my invention, what I claim as new, and desire to secure by Letters Patent, is—

1. In a steam-engine of the type described, the combination with the cylinders, the crank-shaft, and the driving connections as described, of a shaft projecting at right angles to and driven by the crank-shaft; a sleeve keyed on the outer end of said shaft and adapted to be moved a limited distance longitudinally thereon, said sleeve having a gear-wheel on each end thereof; a pinion mounted upon a shaft and always in mesh with one of said gear-wheels; and means to move the sleeve longitudinally on the said shaft.

2. In a steam-engine of the type described, the combination with the cylinders, the crank-shaft, and driving connections as described, of a shaft projecting at right angles to and driven by the crank-shaft; a sleeve keyed to the outer end of the said shaft and adapted to be moved upon the shaft a limited distance longitudinally, said sleeve having a gear-wheel on each end thereof; a pinion mounted upon a shaft and always in mesh with one of said gear-wheels; a secondary shaft having a gear-wheel rigidly secured thereto; and means to move the said sleeve on its shaft whereby when one gear-wheel is in mesh with the gear-wheel on the secondary shaft the latter will be driven in one direction, and when the pinion is thrown in mesh with the said gear-wheel the secondary shaft will be driven in the opposite direction.

3. In a steam-engine of the type described, the combination with the cylinders, crank-shaft, and intermediate driving mechanism, of a gear-wheel keyed to the crank-shaft; a shaft running at right angles to the crank-shaft and having a beveled gear-wheel on one end meshing with the gear-wheel on the crank-shaft; two gear-wheels keyed to the opposite end of the said shaft and adapted to move a limited distance longitudinally on said shaft, said gear-wheels being rigidly connected; a pinion mounted on a shaft and always in mesh with one of said gear-wheels; a gear-wheel secured to the axle of the vehicle to be driven; and means to move the two gear-wheels on the main shaft whereby when one gear-wheel is thrown in mesh with the gear-wheel on the vehicle-axle the latter will be driven in one direction and when the pinion is thrown in mesh with the said gear-wheel the axle will be driven in the opposite direction.

4. The combination with a motor-vehicle having a gear-wheel on the rear axle, of an engine having two cylinders, a crank-shaft, and intermediate driving mechanism; a casing inclosing the said crank-shaft and driving mechanism; a shaft projecting at right angles to and driven by the crank-shaft, and having one end extending through the casing; two gear-wheels rigidly connected together and keyed to the projecting end of the said shaft but adapted to move a limited distance thereon; a pinion mounted on a shaft and always in mesh with one of the gear-wheels on the said shaft; and means to move the said gear-wheels along the shaft, whereby when one of said wheels is thrown in mesh with the gear-wheel on the vehicle-axle the latter will be driven in one direction, and when the wheels are moved in the opposite direction the pinion will be thrown in mesh with the gear-wheel on the vehicle-axle and the latter driven in the opposite direction.

5. In an engine of the type described, the combination with the cylinders, crank-shaft, the intermediate driving mechanism, and a shaft projecting at right angles to and driven by the crank-shaft, of a pump having its piston-rod connected to a gear-wheel revolubly mounted on a stud; a gear-wheel keyed to the angular projecting shaft and adapted to move a limited distance thereon; and means for throwing the said gear-wheel on the shaft in and out of mesh with the gear-wheel to which the piston-rod is connected, whereby the pump can be thrown in or out of operation when desired.

6. The combination with the cylinders, crank-shaft, the intermediate driving mechanism, and a shaft projecting at right angles to and driven by the crank-shaft, of a dust-proof casing inclosing the said parts; a pump projecting through the said casing and having its piston-rod connected to a gear-wheel revolubly mounted on a stud; a gear-wheel keyed to the angular projecting shaft and adapted to be moved a limited distance on said shaft; and means for throwing the gear-wheel on the shaft in and out of mesh with the gear-wheel to which the piston-rod is connected, whereby the pump can be thrown in or out of operation when desired.

In testimony whereof I affix my signature in the presence of two witnesses.

CHARLES R. PFLAGING.

Witnesses:
 CHAPIN A. FERGUSON,
 HERMAN NEWNAN.